(12) United States Patent
Wang et al.

(10) Patent No.: US 11,592,531 B2
(45) Date of Patent: Feb. 28, 2023

(54) BEAM REFLECTING UNIT FOR LIGHT DETECTION AND RANGING (LIDAR)

(71) Applicant: BEIJING VOYAGER TECHNOLOGY CO., LTD., Beijing (CN)

(72) Inventors: Chao Wang, Mountain View, CA (US); Lingkai Kong, Mountain View, CA (US); Yonghong Guo, Mountain View, CA (US); Wenbin Zhu, Mountain View, CA (US)

(73) Assignee: BEIJING VOYAGER TECHNOLOGY CO., LTD., Beijing (CN)

(*) Notice: Subject to any disclaimer, the term of this patent is extended or adjusted under 35 U.S.C. 154(b) by 326 days.

(21) Appl. No.: 16/897,121

(22) Filed: Jun. 9, 2020

(65) Prior Publication Data
US 2021/0382148 A1 Dec. 9, 2021

(51) Int. Cl.
*G01S 7/481* (2006.01)
*G01S 17/894* (2020.01)
*G01S 17/10* (2020.01)

(52) U.S. Cl.
CPC ......... *G01S 7/4816* (2013.01); *G01S 7/4817* (2013.01); *G01S 17/10* (2013.01); *G01S 17/894* (2020.01)

(58) Field of Classification Search
None
See application file for complete search history.

(56) References Cited

U.S. PATENT DOCUMENTS

| | | | |
|---|---|---|---|
| 2018/0196242 A1* | 7/2018 | Maeda | G02B 6/0001 |
| 2020/0191960 A1* | 6/2020 | Zheng | G01S 7/484 |
| 2020/0341122 A1* | 10/2020 | Ahn | G02B 5/0278 |

\* cited by examiner

*Primary Examiner* — Eileen M Adams
(74) *Attorney, Agent, or Firm* — Bayes PLLC

(57) ABSTRACT

Embodiments of the disclosure provide receivers for light detection and ranging (LiDAR). In an example, a receiver includes a beam reflecting unit comprising a plurality of digital micromirror devices (DMDs). The beam reflecting unit is configured to receive an input laser beam returned from an object being scanned by the LiDAR and reflect the input laser beam by at least one DMD selectively switched to an "ON" state at an operation angle to form an output laser beam towards a detector. The detector is configured to receive the output laser beam.

20 Claims, 10 Drawing Sheets

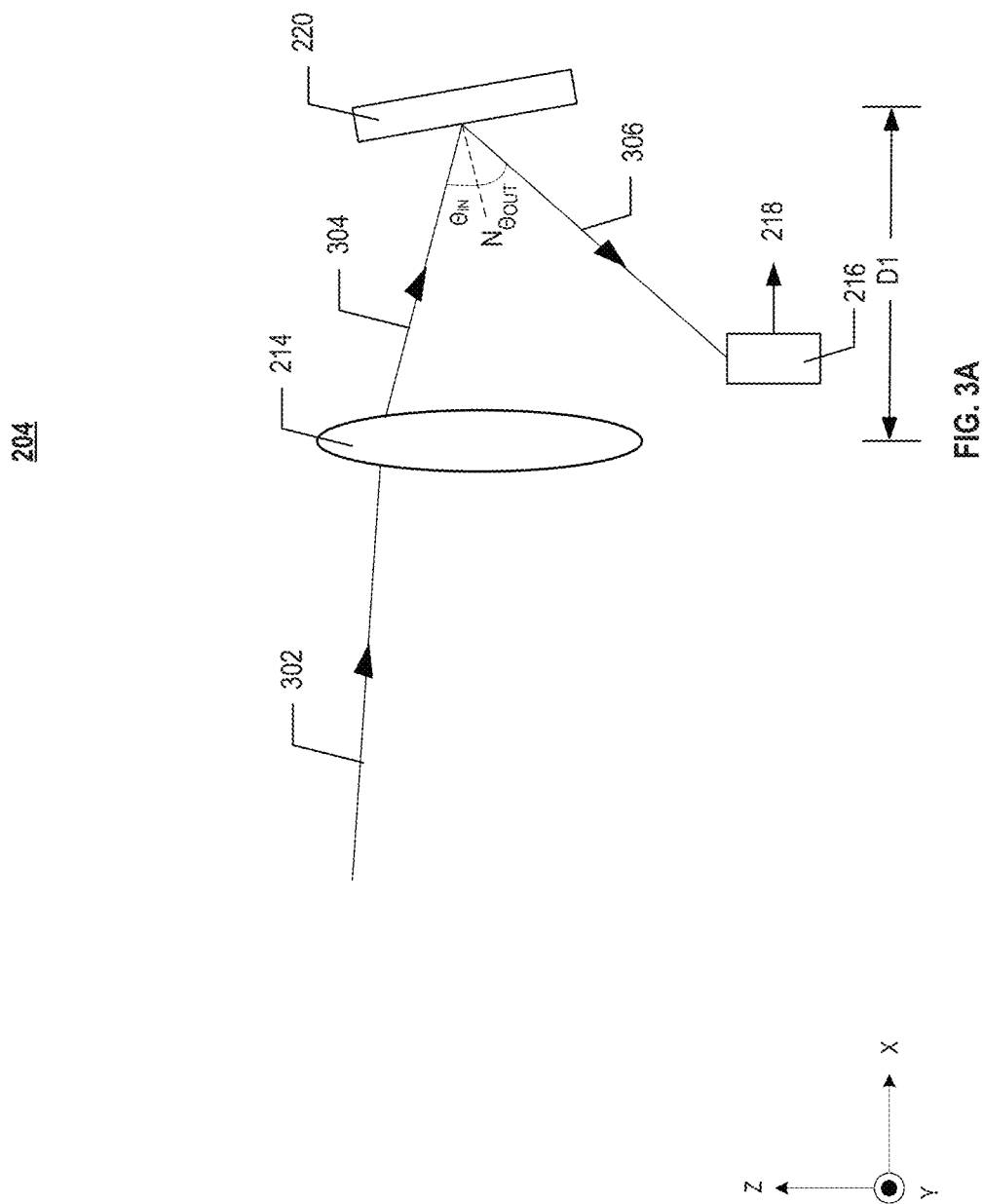

BEAM REFLECTING UNIT FOR LIGHT DETECTION AND RANGING (LIDAR)

TECHNICAL FIELD

The present disclosure relates to a Light Detection and Ranging (LiDAR) system, and more particularly to a LiDAR receiver having a beam reflecting unit.

BACKGROUND

LiDAR systems have been widely used in autonomous driving and producing high-definition maps. For example, LiDAR systems measure distance to a target by illuminating the target with pulsed laser light and measuring the reflected pulses with a sensor. Differences in laser return times and wavelengths can then be used to make digital three-dimensional (3-D) representations of the target. The laser light used for LiDAR scan may be ultraviolet, visible, or near infrared. Because using a narrow laser beam as the incident light from the scanner can map physical features with very high resolution, a LiDAR system is particularly suitable for applications such as high-definition map surveys.

The pulsed laser light beams emitted by a LiDAR system are typically directed to multiple directions to cover a field of view (FOV). As a result, LiDAR system requires a receiver that can receive the returned light signals from different directions. To realize this receiving requirement, most LiDAR systems implement one of two designs: (1) a rotational mirror to deflect the return light signals so that they are all received by a static detector, or (2) using an array of detectors to receive the returned light signals within an range of directions.

However, the performance of the conventional rotational mirror, such as galvo, polygon, and MEMS, is limited. In existing LiDAR receivers, it can be difficult to achieve both high-speed detection and large receiving aperture at the same time, features that are desired in a LiDAR receiver. For example, in order to achieve a high LiDAR scanning speed, the mirror size has to be sufficiently small, which in turn limits the receiving aperture. Limited aperture leads to less receiving signal, which will limit the detection distance. On the other hand, if a large scanning mirror is used, the scanning speed will be limited, which results in a limited refresh rate of the LiDAR. In other words, in existing LiDAR receivers, there is a trade-off between the receiving aperture size and the scanning speed.

Embodiments of the disclosure address the above problems by an improved receiver having a beam reflecting unit for LiDAR.

SUMMARY

Embodiments of the disclosure provide a receiver for light detection and ranging LiDAR. The receiver includes a beam reflecting unit having a plurality of digital micromirror devices (DMDs). The beam reflecting unit is configured to receive an input laser beam returned from an object being scanned by the LiDAR and reflect the input laser beam by at least one DMD selectively switched to an "ON" state at an operation angle to form an output laser beam towards a detector. The detector is configured to receive the output laser beam.

Embodiments of the disclosure also provide another receiver for LiDAR. The receiver includes a beam reflecting unit having a plurality of DMDs with a first DMD and a second DMD. The beam reflecting unit is configured to reflect a first input laser beam from an object being scanned by the LiDAR in a first direction by the first DMD at a first operation angle to form a first output laser beam. The beam reflecting unit is also configured to reflect a second input laser beam from the object in a second direction by the second DMD at a second operation angle to form a second output laser beam. The first operation angle is different from the second operation angle. A detector is configured to receive the first and second output laser beams.

Embodiments of the disclosure also provide a method for receiving a laser beam in a LiDAR. The method includes the following operations. At first, A first laser beam from an object being scanned by the LiDAR is received on a beam reflecting unit. The beam reflecting unit has a plurality of DMDs. A first DMD of the plurality of DMDs is switched to an "ON" state by rotating the first DMD to a first operation angle. The first laser beam is reflected by the first DMD towards a detector. The reflected first laser beam is received on the detector.

It is to be understood that both the foregoing general description and the following detailed description are exemplary and explanatory only and are not restrictive of the invention, as claimed.

BRIEF DESCRIPTION OF THE DRAWINGS

FIG. 3A illustrates a receiver having an exemplary beam reflecting unit, according to embodiments of the disclosure.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

The present disclosure is made in a three-dimensional coordinate system, with x-axis, y-axis, and z-axis representing the three dimensions. In the present disclosure, the "fast axis" is parallel to the z-axis, the "slow axis" is parallel to the y-axis, and the "optical axis" is parallel to the x-axis. The z-axis (e.g., the vertical axis/direction) is perpendicular to the x-y plane (e.g., the horizontal/lateral plane), and the x-axis and the y axis is perpendicular to each other. The x-axis/direction and the y-axis/direction can each be referred to as a lateral direction.

In the present disclosure, the "incident direction" of a light beam refers to the direction defined by the incident angle between the light beam and the surface normal of the object the light beam is incident on. In the present disclosure, the "exiting direction" of a light beam refers to the direction defined by the exiting angle between the light beam and the surface normal of the object the light beam is exiting.

In the present disclosure, an "incident surface" refers to the surface on which a light beam is incident, and an "exiting surface" refers to the surface from which a light beam is exiting. In some applications, incident and exiting surfaces of an object (e.g., a DMD) are both referred to as the top surface of the object.

In the present disclosure, an "operation angle" refers to the angle at which a light beam is deflected towards and collected by, e.g., a photosensor, and an "non-operation angle" refers to the angle at which a light beam is deflected away and not collected.

In the present disclosure, the term "nominal/nominally" refers to a desired, or target, value of a characteristic or parameter for a component or a process operation, set during the design phase of a product or a process, together with a range of values above and/or below the desired value. The range of values can be due to slight variations in manufacturing processes or tolerances. As used herein, the term "about" indicates the value of a given quantity that can vary based on a particular technology node associated with the subject semiconductor device. Based on the particular technology node, the term "about" can indicate a value of a given quantity that varies within, for example, 10-30% of the value (e.g., ±10%, ±20%, or ±30% of the value).

In the present disclosure, the distance between two objects, e.g., a lens and an AO beam deflecting unit, is defined to be the distance between the centers (e.g., geometric centers) of the objects.

Figure 1:
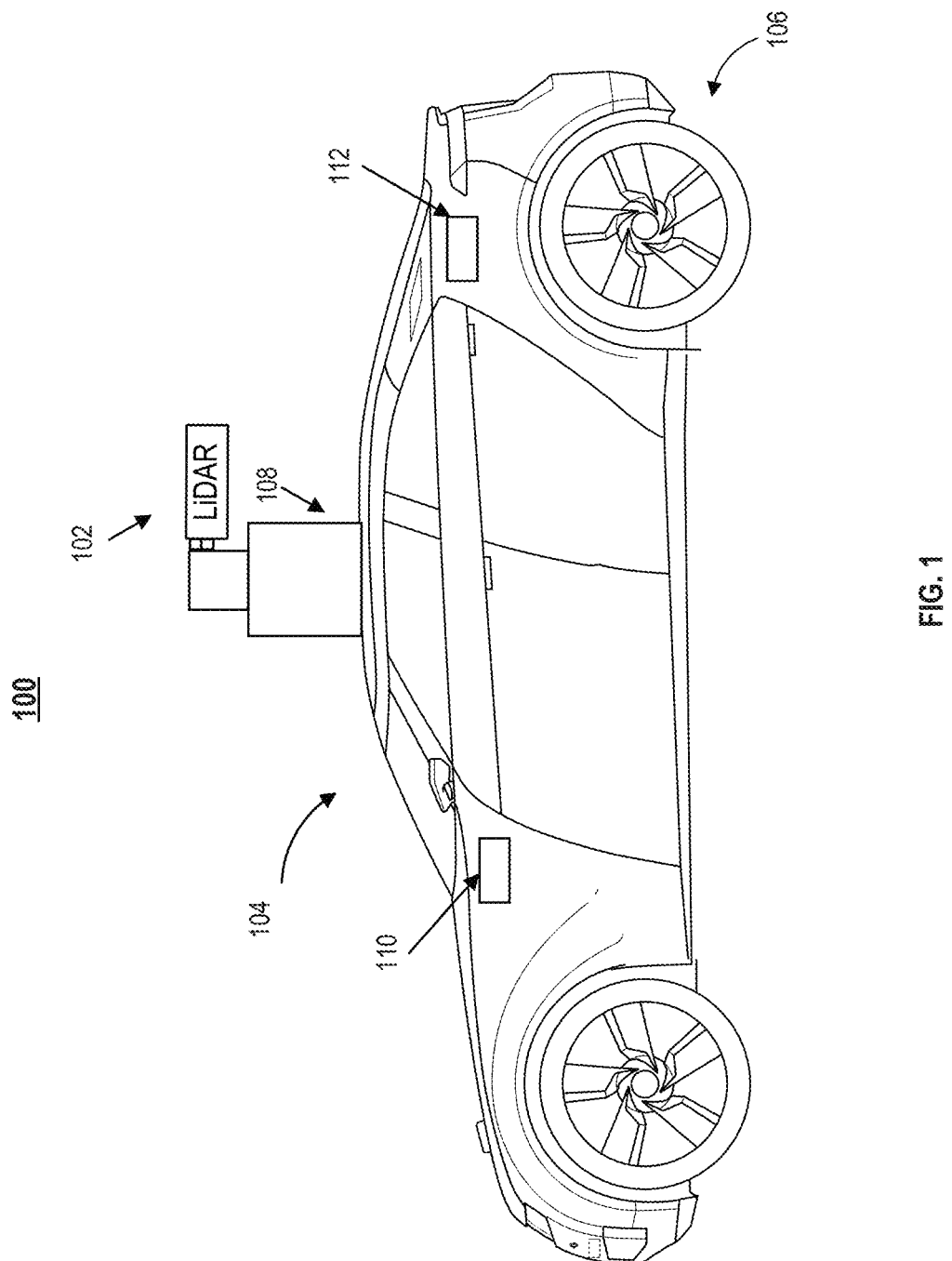
FIG. 1 illustrates a schematic diagram of an exemplary vehicle equipped with a LiDAR system, according to embodiments of the disclosure.

FIG. 1 illustrates a schematic diagram of an exemplary vehicle 100 equipped with a LiDAR system 102, according to embodiments of the disclosure. Consistent with some embodiments, vehicle 100 may be a survey vehicle configured for acquiring data for constructing a high-definition map or 3-D modeling. It is contemplated that vehicle 100 may be any suitable moving vehicle such as an electric vehicle, a fuel cell vehicle, a hybrid vehicle, or a conventional internal combustion engine vehicle. Vehicle 100 may have a body 104 and at least one wheel 106. Body 104 may be any body style, such as a sports vehicle, a coupe, a sedan, a pick-up truck, a station wagon, a sports utility vehicle (SUV), a minivan, or a conversion van. In some embodiments of the present disclosure, vehicle 100 may include a pair of front wheels and a pair of rear wheels, as illustrated in FIG. 1. However, it is contemplated that vehicle 100 may have less wheels or equivalent structures that enable vehicle 100 to move around. In some embodiments of the present disclosure, vehicle 100 may be configured to be operated by an operator occupying the vehicle, remotely controlled, and/or autonomous.

As illustrated in FIG. 1, vehicle 100 may be equipped with LiDAR system 102 mounted to body 104 via a mounting structure 108. Mounting structure 108 may be an electromechanical device installed or otherwise attached to body 104 of vehicle 100. Vehicle 100 may be additionally equipped with a sensor 110 inside or outside body 104 using any suitable mounting mechanisms. It is contemplated that the manners in which LiDAR system 102 or sensor 110 can be equipped on vehicle 100 are not limited by the example shown in FIG. 1 and may be modified depending on the types of LiDAR system 102 and sensor 110 and/or vehicle 100 to achieve desirable 3-D sensing performance.

Consistent with some embodiments, LiDAR system 102 and sensor 110 may be configured to capture data as vehicle 100 moves along a trajectory. For example, a transmitter of LiDAR system 102 is configured to scan the surrounding and acquire point clouds. LiDAR system 102 measures distance to a target by illuminating the target with pulsed laser light and measuring the reflected pulses with a receiver. The laser light used for LiDAR system 102 may be ultraviolet, visible, or near infrared. In some embodiments of the present disclosure, LiDAR system 102 may capture point clouds. As vehicle 100 moves along the trajectory, LiDAR system 102 may continuously capture data. Each set of scene data captured at a certain time range is known as a data frame.

As illustrated in FIG. 1, vehicle 100 may be additionally equipped with sensor 110, which may include sensors used in a navigation unit, such as a Global Positioning System (GPS) receiver and one or more Inertial Measurement Unit (IMU) sensors.

Consistent with the present disclosure, vehicle 100 may include a local controller 112 inside body 104 of vehicle 100 or communicate with a remote computing device, such as a server (not illustrated in FIG. 1), for controlling the operations of LiDAR system 102 and sensor 110. In some embodiments of the present disclosure, controller 112 may have different modules in a single device, such as an integrated circuit (IC) chip (implemented as an application-specific integrated circuit (ASIC) or a field-programmable gate array (FPGA)), or separate devices with dedicated functions. In some embodiments of the present disclosure, one or more components of controller 112 may be located inside vehicle 100 or may be alternatively in a mobile device, in the cloud, or another remote location. Components of controller 112 may be in an integrated device or distributed at different locations but communicate with each other through a network (not shown).

Figure 2:
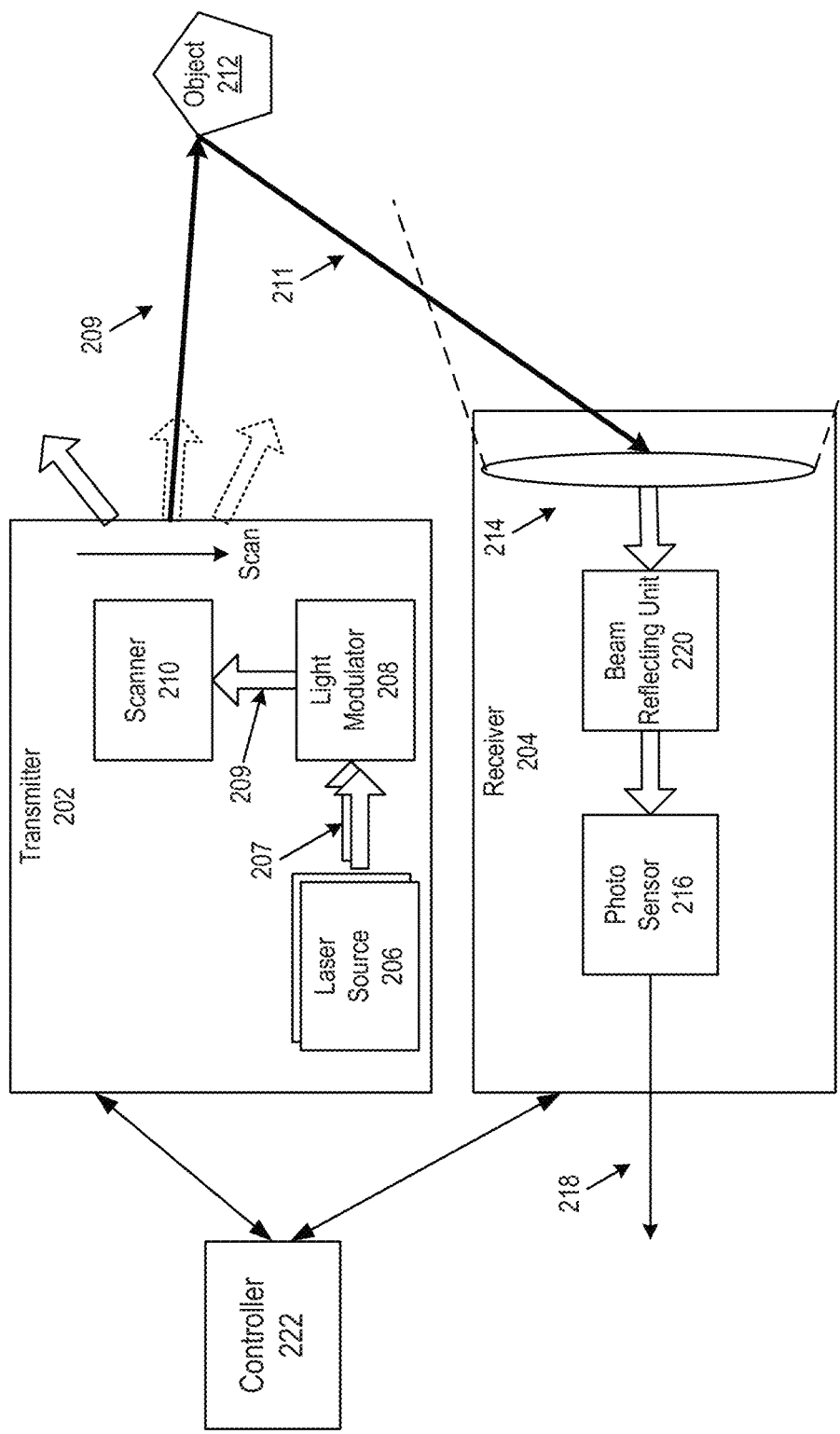
FIG. 2 illustrates a block diagram of an exemplary LiDAR system having a receiver with a beam reflecting unit, according to embodiments of the disclosure.

FIG. 2 illustrates a block diagram of an exemplary LiDAR system 102 having a receiver 204 with a beam reflecting unit 220, according to embodiments of the disclosure. LiDAR system 102 may include a transmitter 202, receiver 204, and a controller 222. Transmitter 202 may emit laser beams within a scan angle. Transmitter 202 may include one or more laser sources 206, a light modulator 208, and a scanner 210.

As part of LiDAR system 102, transmitter 202 can sequentially emit a stream of pulsed laser beams in different directions within its scan angle, as illustrated in FIG. 2. A laser source 206 may be configured to provide a native laser beam 207 in a respective incident direction to light modulator 208. In some embodiments of the present disclosure, each laser source 206 may generate one or more pulsed laser beams in the ultraviolet, visible, or near infrared wavelength range.

Laser source 206 can include any suitable laser emitting device(s) such as one or more pulsed laser diode (PLD). Depending on the light-emitting materials (e.g., semiconductor materials) in the laser emitting devices, the wavelength of native laser beam 207 provided by a PLD may be any suitable value(s) that can be detected by receiver 204. For example, the wavelength of native laser beam 207 may be smaller than 1,100 nm, such as 405 nm, between 445 nm and 465 nm, between 510 nm and 525 nm, 532 nm, 635 nm, between 650 nm and 660 nm, 670 nm, 760 nm, 785 nm, 808 nm, 848 nm, or 905 nm. Light modulator 208 can spatially collimate and combine multiple laser beams provided by multiple laser sources 206 into a single combined laser beam and minimize the beam divergence in the combined laser beam.

Scanner 210 may be configured to emit combined laser beam 209 to an object 212 in a scanning direction. Scanner 210 may scan object 212 using combined laser beam 209 combined by light modulator 208, within a scan angle at a scan rate. Object 212 may be made of a wide range of materials including, for example, non-metallic objects, rocks, rain, chemical compounds, aerosols, clouds and even single molecules. The wavelength of combined laser beam 209 may vary based on the composition of object 212. At each time point during the scan, scanner 210 may emit combined laser beam 209 to object 212 in the scanning direction within the scan angle. Scanner 210 may also include optical components (e.g., lenses, mirrors) that can focus pulsed laser light into a narrow laser beam to increase the scan resolution and range of object 212.

As part of LiDAR system 102, receiver 204 may be configured to detect a returned laser beam 211 from object 212 in a direction other than the scanning direction. After collecting and sensing the laser beams, receiver 204 can output an electrical signal reflecting the intensity of the returned laser beams. Upon contact, combined laser beam 209 can be reflected by object 212 via backscattering, such as Rayleigh scattering, Mie scattering, Raman scattering, and fluorescence, forming returned laser beam 211 towards receiver 204. Returned laser beam 211 may be returned from object 212 and have the same wavelength as combined laser beam 209. As illustrated in FIG. 2, receiver 204 may include a lens 214, a photosensor 216, and a beam reflecting unit 220, consistent with the embodiments of the present disclosure. For illustrative purposes, in FIG. 2, beam reflecting unit 220 is depicted to be positioned between lens 214 and photosensor 216. As described below, beam reflecting unit 220 can be placed between lens 214 and photosensor 216, and/or between object 212 and lens 214. The actual placement of beam reflecting unit 220 should not be limited by the depiction in the figures. Lens 214, as an example of a beam converging device, may be configured to collect light from a respective direction in its FOV. At each time point during the scan, returned laser beam 211 may be collected by receiver 204, e.g., by lens 214 or beam reflecting unit 220, as described in detail as follows.

As previously explained, in an existing LiDAR system, high scanning speed and large scanning aperture can be difficult to achieve at the same time due to limitations of the conventional receiver. The existing receiver often includes a rotational mirror that can physically rotate to alter the travel direction of a returned laser beam after it passes the lens such that the reflected or scattered laser beam travels towards the photosensor. The rotational mirror can have several limitations. For example, the rotational mirror is often composed of instruments such as a mirror galvanometer, a polygon mirror, a micro-electromechanical system (MEMS), and the like. The size of the rotational mirror often limits its scanning speed. If the LiDAR system has a high scanning speed (e.g., and high refreshing rate), the size of the rotational mirror needs to be sufficiently small so that the rotational mirror can be quickly adjusted/oriented to a desired angle to deflect the returned laser beam to the photosensor. However, a rotational mirror with a relatively small size often has a smaller receiving aperture, limiting the detection distance. That is, the performance of an existing receiver is limited by this trade-off between high scanning speed and large scanning aperture.

The present disclosure provides a LiDAR system with an improved receiver by employing a beam reflecting unit. With the beam reflecting unit, the disclosed LiDAR receiver provides improved accommodation to high scanning speed and larger scanning aperture at the same time. Compared to an existing LiDAR system, the performance of the receiver is less (or not) limited by the size of the beam reflecting unit. The beam reflecting unit may include one or more beam reflectors, which can be placed at any suitable locations along the travel path of the returned laser beam to direct the returned laser beam towards the photosensor. In various applications, by configuring/optimizing the number, positions, size, and reflection angles of the beam reflector in the receiver, an improved (e.g., greater) FOV can be obtained, compared to an existing LiDAR system. The returned laser beam can also be directed to a smaller sensing area, increasing the detection precision. Based on the configuration of the beam reflecting unit, in some embodiments, a single photosensor can be used for the light detection and collection.

As described in the embodiments of the present disclosure, a beam reflecting unit can include one or more beam reflectors that deflect an incident laser beam by reflection. The reflection angle of the beam reflecting unit may be a combination of the respective reflection angle of each beam reflector. Each beam reflector includes an array of light reflecting elements that can individually deflect the incident laser beam (e.g., the returned laser beam) by reflection. The light reflecting element(s) configured to receive and deflect the incident laser beam can each rotate to a desired orientation (e.g., a respective operation angle) at a high speed, e.g., faster than rotating a conventional rotational mirror in an existing LiDAR system, to timely deflect the incident laser beam towards a desired direction/location, thus is more suitable for a LiDAR system with high scanning speed. Meanwhile, the number of light reflecting elements configured to receive and deflect the incident laser beam is not limited by the overall size of the respective beam reflector (or beam reflecting unit). The beam reflector (of beam reflecting unit) can then be fabricated to be sufficiently large to increase the receiving aperture. Therefore, compared to conventional rotational mirrors, the performance of the beam reflecting unit is less limited by size and speed of the beam reflecting unit.

In some embodiments, the array of light reflecting elements include an array of DMDs, which stabilize in an "ON" state to deflect light for collection and in an "OFF" state to deflect light away. In operation, one or more DMDs may be in the "ON" state to receive and deflect an incident laser beam towards a desired direction/position. The DMDs that are in the "ON" state in operation may or may not have the same operation angles. That is, the DMDs in a beam reflector are configured to operate under one or more operation angles, and each operation angle is configured to direct the incident laser beam towards the photosensor with desired/improved precision. Various operation angles in a beam reflector can facilitate incident laser beams from various directions to be effectively deflected to desired directions/locations. Control signals are configured to control the rotation of the DMDs. The number and/or locations of DMDs and their operation angles to receive and reflect the incident laser beam in a beam reflector can be determined based on the design and fabrication of LiDAR system 102. In some embodiments, DMDs in a partial/full row can have the same operation angle. In some embodiments, DMDs in a partial/full column can have the same operation angle. In some embodiments, DMDs in each row/column can have a different operation angle. In some embodiments, each DMD in a beam reflector can have a distinct operation angle. The control signals may switch the individual DMDs between the "ON" and "OFF" states accordingly, e.g., based on the whether the DMDs have an operation angle desired for the beam reflection. In some embodiments, each DMD is controlled by a separate control signal.

By utilizing the light reflection properties of DMDs, applications can be designed to achieve the light reflection function. In one application, a beam reflector may have an array of DMDs each having a different operation angle in the "ON" state in operation, and the beam reflector may deflect incident laser beams from various directions to photosensor 216 with desirable precision. By using the DMDs in a beam reflector (or beam reflecting unit 220), the receiving aperture is determined by the number of DMDs in the "ON" state, rather than the physical dimension of the beam reflector (or beam reflecting unit 220). Also, each DMD for receiving and reflecting an incident laser beam can rotate to its respective operation angle at a high speed. The performance of the beam reflector (or beam reflecting unit 220) is thus less limited by its size and/or "rotating" speed.

Figure 3B:
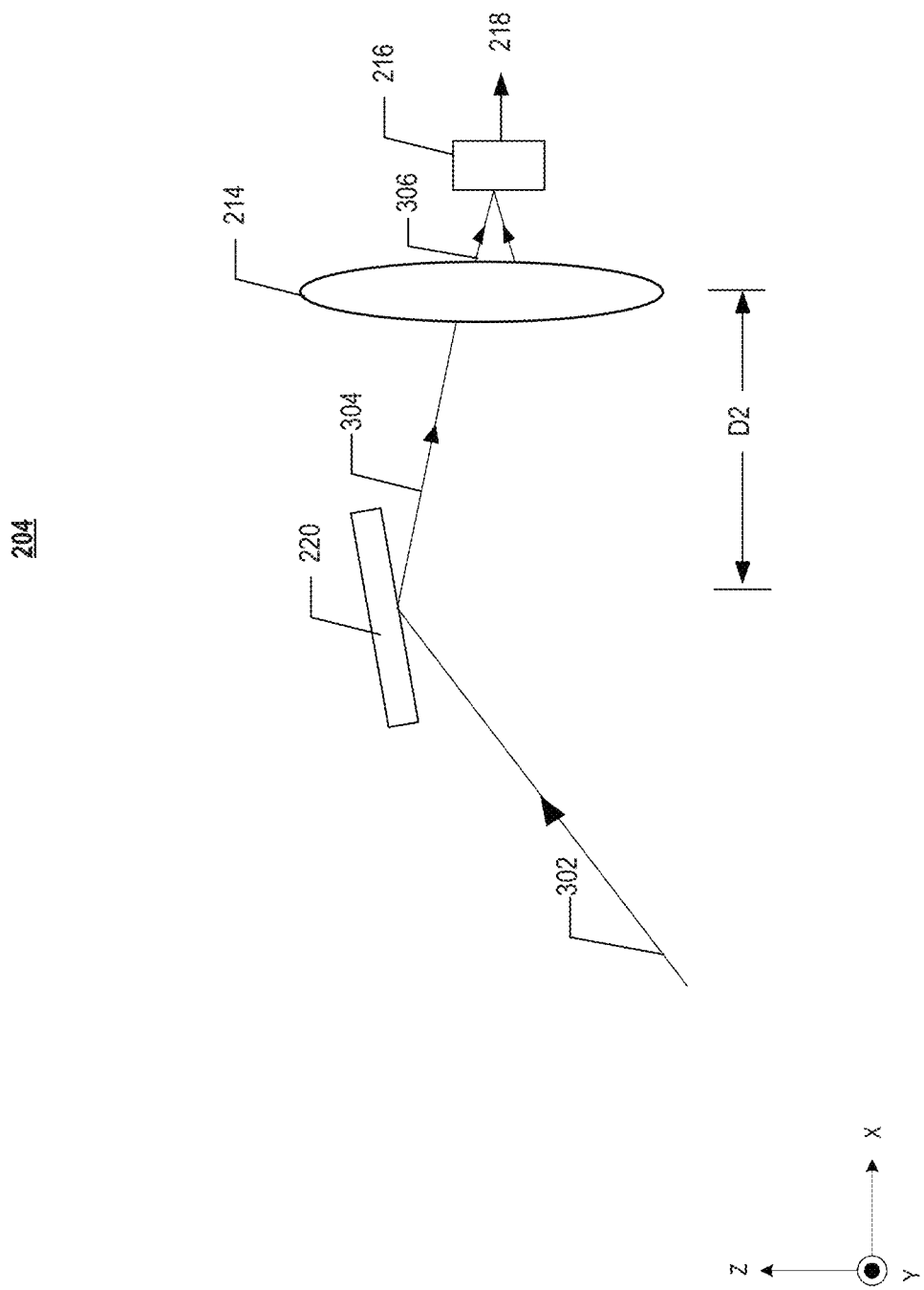
FIG. 3B illustrates another receiver having an exemplary beam reflecting unit, according to embodiments of the disclosure.
Figure 3C:
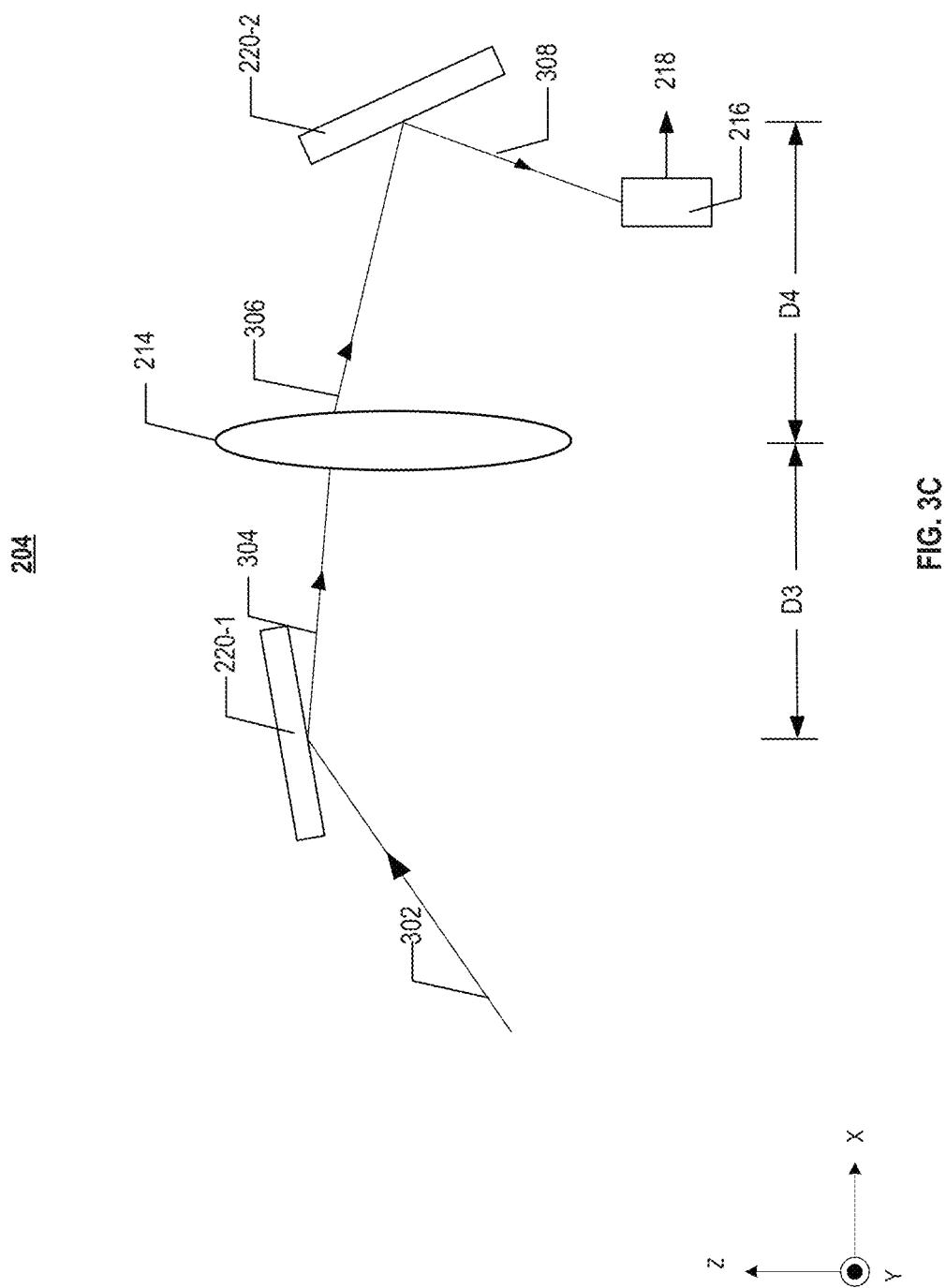
FIG. 3C illustrates yet another receiver having an exemplary beam reflecting unit, according to embodiments of the disclosure.

FIGS. 3A, 3B, and 3C each illustrates an exemplary configuration of receiver 204, according to some embodiments. As shown in FIG. 3A, beam reflecting unit 220 may be placed between lens 214 and photosensor 216. A first laser beam 302 may represent returned laser beam 211. First laser beam 302 may be incident on and converged by lens 214, forming a second laser beam 304. Second laser beam 304 may be incident on and reflected by beam reflecting unit 220, forming a third laser beam 306. Third laser beam 306 may be collected by photosensor 216, which outputs an electrical signal 218 that can be detected by other hardware and/or software, such as controller 222. It should be noted that, in the present disclosure, the shape and placement of beam reflecting unit 220 is only for illustrating the exemplary travel path of laser beams and do not limit the actual arrangement of beam reflector included in beam reflecting unit 220. In various embodiments, each beam reflector in beam reflecting unit 220 can be placed at any suitable location to result in the reflection angle of beam reflecting unit 220.

Beam reflecting unit 220 may direct an input laser beam (e.g., second laser beam 304) to form an output laser beam (e.g., third laser beam 306), which travels towards photosensor 216. That is, beam reflecting unit 220 may change the travel direction of the input laser beam and deflect the input laser beam towards photosensor 216 such that the input and output laser beams do not travel in parallel. The angle between the input laser beam and the output laser beam is represented by the difference between the travel directions of the input and output laser beams. The angle can be referred to as the reflection angle of beam reflecting unit 220. In some embodiments, the angle takes a nonzero value. In various embodiments, depending on the position of photosensor 216 relative to beam reflecting unit 220, the output laser beam can be deflected by beam reflecting unit 220 for a certain reflection angle to travel towards photosensor 216.

As shown in FIG. 3A, second laser beam 304 and third laser beam 306 have different travel directions. Second laser beam 304 may be incident on beam reflecting unit 220 at an incident angle $\theta_{IN}$ and be reflected to an exiting angle $\theta_{OUT}$, where incident angle $\theta_{IN}$ represents the angle between second laser beam 304 and the surface normal N of beam reflecting unit 220, and exiting angle $\theta_{OUT}$ represents the angle between third laser beam 306 and the surface normal N of beam reflecting unit 220. In some embodiments, beam reflecting unit 220 includes an array of DMDs for receiving and deflecting second laser beam 304 and the surface normal N represents the surface normal of the DMD array. The reflection angle of beam reflecting unit 220 (or a beam reflector) is the angle between second laser beam 304 and third laser beam 306 (e.g., the input and output laser beams), i.e., $(\theta_{IN}+\theta_{OUT})$, where $\theta_{IN}$ may be equal to $\theta_{OUT}$.

As previously described, beam reflecting unit 220 may include one or more beam reflectors. When beam reflecting unit 220 includes only one beam reflector, the reflection angle of beam reflecting unit 220 may be determined by the surface orientation of the single beam deflector, which is essentially the surface orientation of the DMD array deflecting second laser beam 304 (e.g., the reflection angle of the DMD array). When beam reflecting unit 220 includes more than one beam reflectors, the reflection angle of beam reflecting unit 220 may be determined by the respective reflection angle of each beam reflector (i.e., the respective angles of DMDs receiving and deflecting the input laser beam).

In some embodiments, the position of beam reflecting unit 220 is adjustable (e.g., can be optimized) such that second laser beam 304 can be received on a desired area of beam reflecting unit 220. In some embodiments, the position of beam reflecting unit 220 is adjusted such that a maximum portion (e.g., all) of second laser beam 304 is deflected. In some embodiments, the optimized position of beam reflecting unit 220 also allows third laser beam 306 to be incident on photosensor 216. As shown in FIG. 3A, a distance D1 between lens 214 and beam reflecting unit 220 can be determined or optimized to ensure any input laser beam of beam reflecting unit 220 (e.g., second laser beam 304) to be deflected onto photosensor 216. In various embodiments, D1 can be a constant value or a variable value. In some embodiments, to adjust D1, beam reflecting unit 220 can be coupled to a motor and/or an actuator that can move beam reflecting unit 220 during a laser light detection process. In some embodiments, based on the travel direction of first laser beam 302 and/or the relative positions between lens 214 and photosensor 216, the motor/actuator is configured to move beam reflecting unit 220, e.g., along the x-axis and/or the y-axis, to timely deflect second laser beam 304 such that third laser beam 306 impinges on photosensor 216. In some embodiments, the motor/actuator may be controlled by a controller 222.

Figure 4:
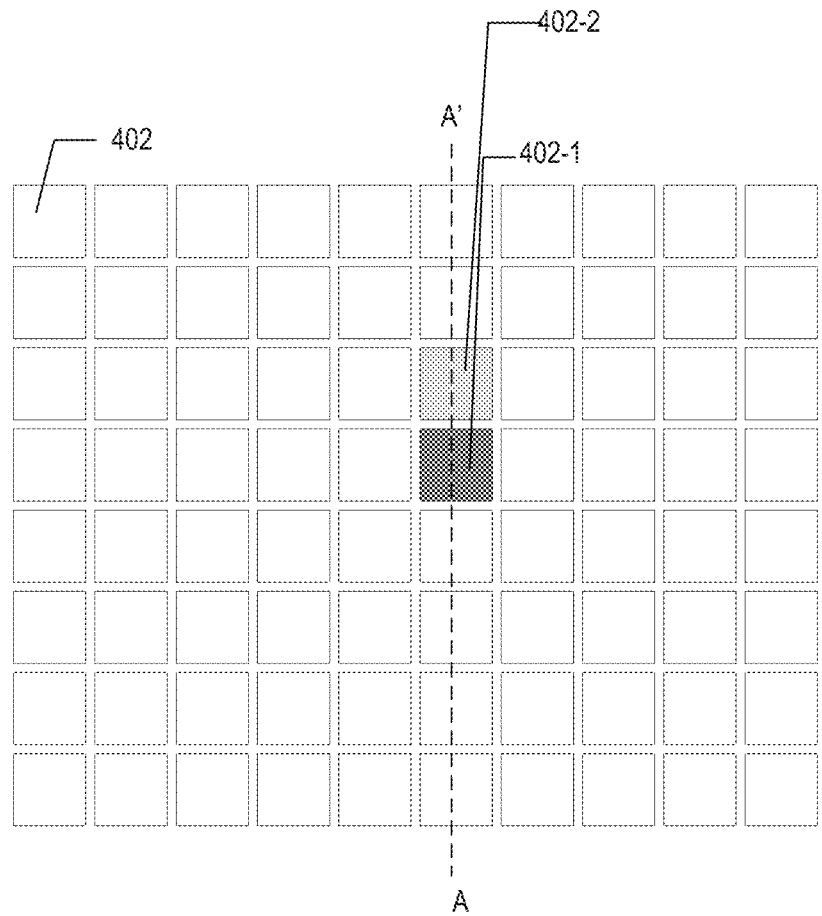
FIG. 4 illustrates a schematic top view of an exemplary beam reflecting unit, according to embodiments of the disclosure.
Figure 5:
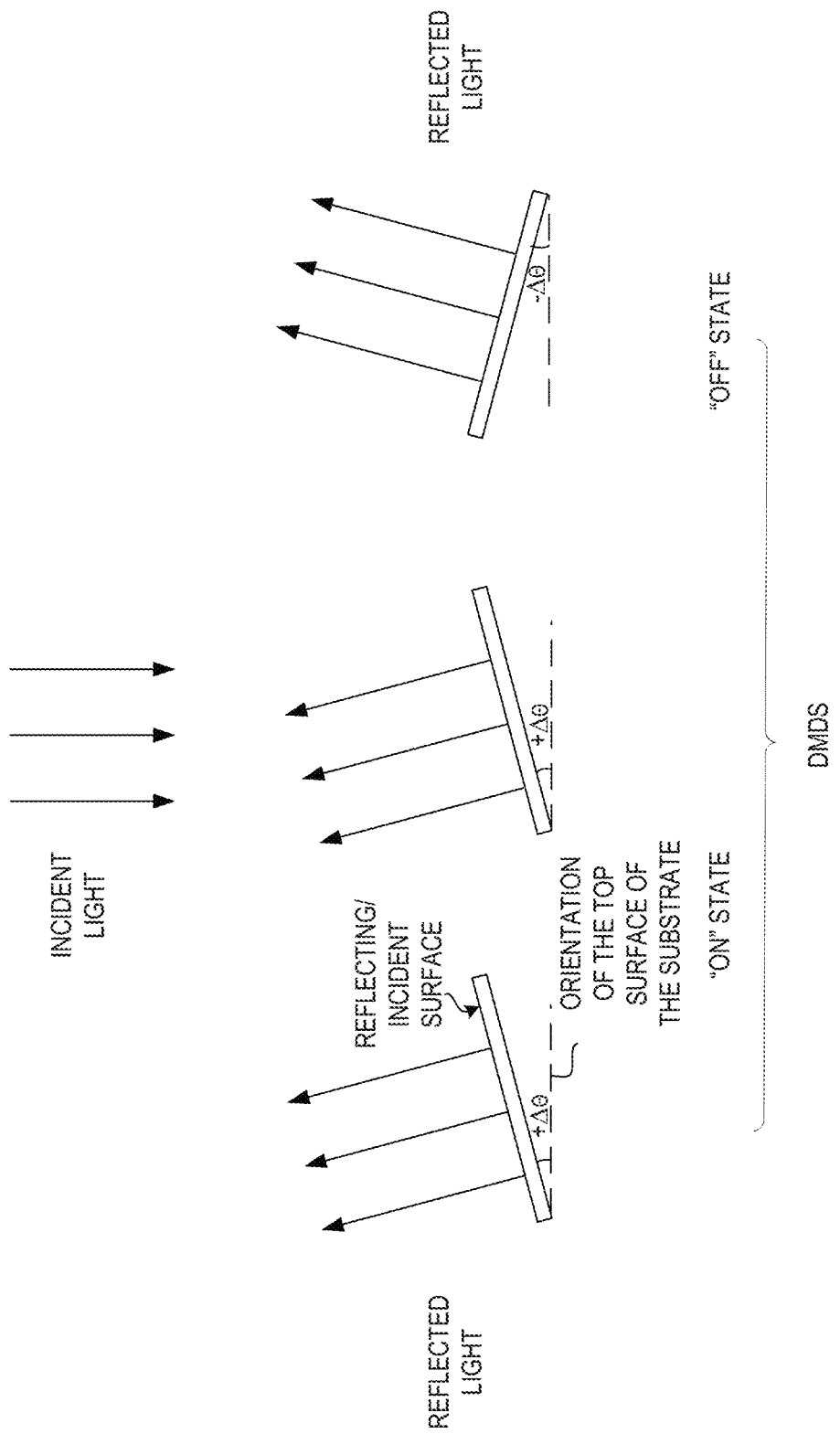
FIG. 5 illustrates a schematic view of a plurality of DMDs in "ON" state or "OFF" state.
Figure 6A:
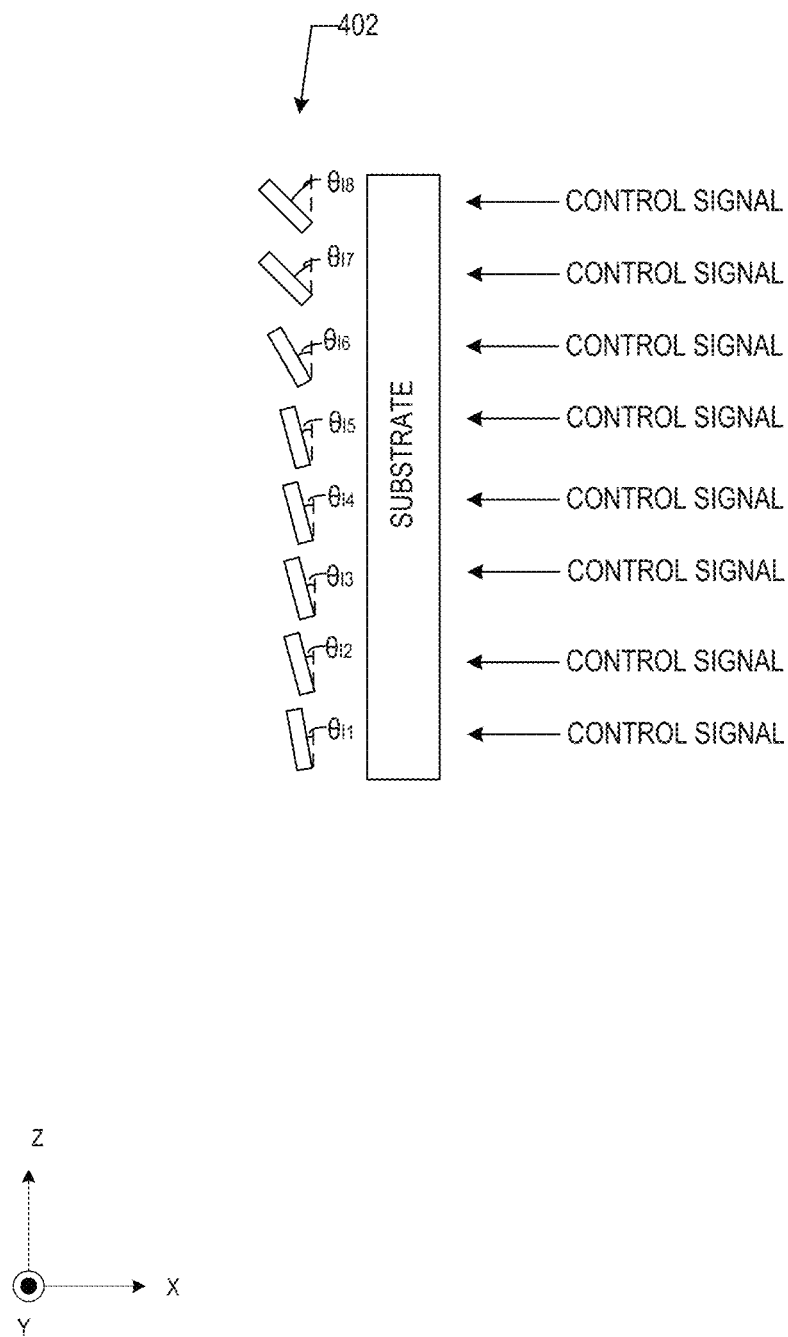
FIG. 6A illustrates a schematic diagram of a plurality of DMDs at respective initial rotation angles, according to embodiments of the present disclosure.
Figure 6B:
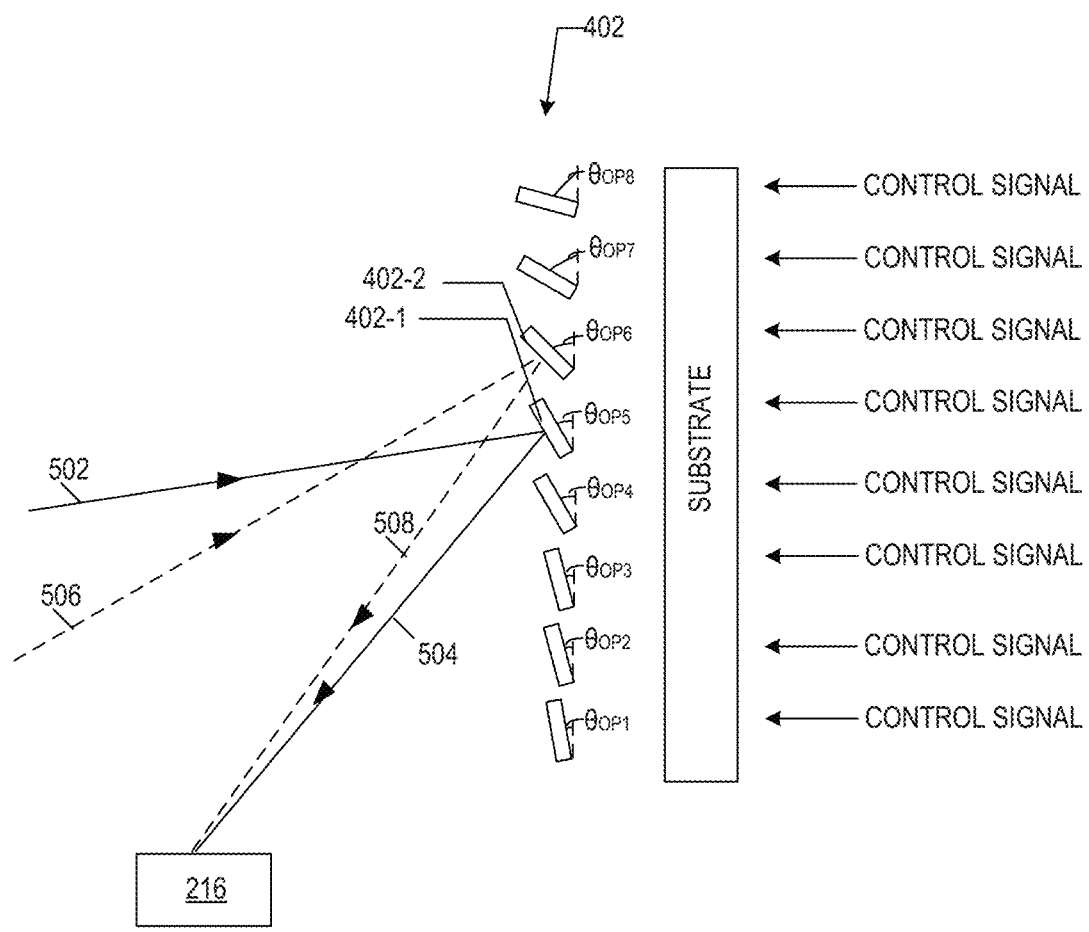
FIG. 6B illustrates a schematic diagram of a plurality of DMDs at respective operation angles, according to embodiments of the present disclosure.

FIG. 4 illustrates a top view of a DMD array 400 in a beam reflector. FIG. 5 explains working mechanisms of a DMD array. FIGS. 6A and 6B illustrate schematic views of beam reflecting unit 220 operating under one exemplary working state (the plurality of reflecting elements at respective initial rotation angles) and another exemplary working state (the plurality of reflecting elements at respective operation angles), respectively.

FIGS. 4 and 5 are described together with FIGS. 6A and 6B, respectively, to explain the embodiments of the present disclosure. It should be noted that, the number, arrangement, and shapes of DMDs in the present disclosure are for illustration only and do not limit the number, arrangement, and shapes of DMDs in an actual beam reflector. For example, DMD array 400 may include DMDs 402 arranged in an 8×8 array as illustrated in FIG. 4. FIG. 4 will be used as an example to explain the working mechanism of a beam reflector (or beam reflecting unit 220). In some embodiment, DMD 400 may be the entirety or a portion of a beam reflector (or beam reflecting unit 220), which may include DMDs arranged in a 8×8 array, a 16×8 array, or a 16×16 array, etc. DMDs 402 can each have any suitable shape and they can be arranged sufficiently close to one another to minimize light loss. In some embodiments, DMDs 402 are square-shaped and are each tens of microns in dimension. The distance between two adjacent DMDs 402 (i.e., the geometric centers of the two adjacent DMDs 402) may be nominally equal to, each about tens of microns. In various embodiments, DMDs may be arranged to collectively form an array of any suitable shape, e.g., a circular shape, square shape, rectangular shape, and/or irregular shape, depending on the design of the beam reflector.

A DMD is an optical micro-electrical-mechanical element that contains a highly reflective micromirror, often made of aluminum, although other reflective materials can also be suitable. As previously described, a DMD may be in an "ON" state to receive and deflect an input laser beam towards a desired direction/location to be collected, and may be in an "OFF" state to deflect away any signal that is not to be collected. The "ON" and "OFF" states may be determined by the operation angle of the DMD. Consistent with the present disclosure, an "operation angle" represents an orientation at which the DMD is in the "ON" or "OFF" state. The DMD can be switched to the "ON" state by rotating for a "tilt angle" from an "initial rotation angle" (i.e., an initial orientation of the DMD with no control signal applied) to its operation angle. The tilt angle of a DMD is determined by geometry and electrostatics of the DMD. For example, FIG. 5 illustrates an example of three DMDs coupled to or mounted on a substrate (not shown in FIG. 5), forming a chip. Two of the DMDs are in the "ON" state and the other is in the "OFF" state.

By convention, the DMD is in an "ON" state when tilted towards the illumination (e.g., the incident light), and is in an "OFF" state when tilted away from the illumination. As shown in FIG. 5, The DMD is rotated by a tilt angle (+Δθ) from its initial orientation to be switched to the "ON" state, and rotated by a negative tilt angle (−Δθ) from its initial orientation to be switched to the "OFF" state. As shown in FIG. 5, assuming the initial orientation of a DMD (or the receiving/incident surface of the DMD) is parallel with the top surface of the substrate for the DMD, the angle between the receiving/incident surface of the DMD in the "ON" state and the top surface of the substrate would be the tilt angle (+Δθ). Similarly, the angle between the receiving/incident surface of the DMD in the "OFF" state and the top surface of the substrate would be the negative tilt angle (−Δθ). In the present disclosure, when in the "ON" state, DMD 402 directs/reflects the input laser beam in a direction towards photosensor 216. When in the "OFF" state, DMD 402 deflects the input laser beam in a direction away from photosensor 216. The DMD may be switched between the "ON" and "OFF" states by a respective control signal.

The tilt angle may at least partially impact the reflection angle of the respective DMD (or beam reflector). In some embodiments, the value of Δθ can be any suitable value between 10° and 20°. For example, Δθ may be 10°, 10.5°, 11°, 11.5°, 12°, 12.5°, 13°, 13.5°, 14°, 14.5°, 15°, 15.5°, 16°, 16.5°, 17°, 17.5°, 18°, 18.5°, 19°, 19.5°, 20°. In various embodiments, Δθ can also be any other suitable values. In some embodiments, the operation angle of the DMD is equal to the tilt angle if the DMD is not initially rotated (e.g., have an initial rotation angle of zero or being parallel with the top surface of the substrate), and the non-operation angle of the DMD is equal to the negative tilt angle of the DMD. In various embodiments, DMDs formed on the same chip may have different tilt angles.

In some embodiments, one or more DMDs in a beam reflector can each have an initial orientation or be initially rotated before the DMDs are rotated by the respective tilt angles. The initial rotation angle is the angle between the incident/receiving surface of a DMD and its substrate when no control signal is applied. An example of initial rotation angles is shown in FIG. 6A. The initial rotation angle of a DMD may also impact the direction that the incident light is deflected/directed and thus partially determine the reflection angle of the respective DMD (or beam reflector). In some embodiments, the initial rotation angle can be any suitable number between 0° and 90°. For example, the initial rotation angle may be 2°, 5°, 8°, 10°, 12°, 15°, 18°, 20°, 25°, 28°, 30°, 35°, 40°, 45°, 50°, 55°, 60°, 65°, 70°, 75°, 80°, 85°, 89.5°. In some embodiments, the initial rotation angle is between 0° and 30°. In various embodiments, the initial rotation angle can also include any other suitable values. In some embodiments, at least some DMDs in a beam reflector (or beam reflecting unit 220) have different initial rotation angles. In some embodiments, the initial rotation angle of a DMD can be a fixed value, e.g., determined during the fabrication of the DMD. In some embodiments, the initial rotation angle of a DMD can be varied, e.g., by incorporating suitable electrical and/or mechanical coupling controlled by the respective control signal of the DMD. The specific values of the initial rotation angles should not be limited by the embodiments of the present disclosure.

The operation angle of a DMD is a combination of the respective initial rotation angle and the tilt angle. Likewise, the non-operation angle of the DMD can be is a combination of the respective initial rotation angle and the negative tilt angle. For example, the operation angle of a DMD may be the sum of the respective initial rotation angle and the tilt angle, and the non-operation angle of a DMD may be the difference between the respective initial rotation angle and the tilt angle. In operation, the initial rotation angle and the tilt angle of a DMD may be predetermined so that when the DMD is in the "ON" state, it can deflect an incident laser beam towards a desired direction/position. The operation angle of the DMD thus determines the reflection angle of the DMD (or respective beam reflector).

In some embodiments, one or more DMDs in a beam reflector (or beam deflecting unit 220) have a respective initial rotation angle that is different from one another. Meanwhile, one or more DMDs in a beam reflector (or beam deflecting unit 220) can have a respective tilt angle that is different from one another. The operation angle of any DMD in a beam reflector can then be optimized by individually manipulating the respective initial rotation angle, the respective tilt angle, and/or the combination of the initial rotation angle and the tilt angle.

For example, in an application, each DMD in a beam reflector (or beam deflecting unit 220) may have a respective (e.g., different) initial rotation angle, a respective (e.g., different) tilt angle, and/or a respective (e.g., different) operation angle. Being adjusted to different operation angles, the beam reflector may deflect incident laser beams from various different directions each to a sufficiently small photosensor. The optimization of the operation angles of DMDs in a beam reflector can minimize light loss and maximize precision in the deflection of the incident laser beam. Because the deflection angle is adjusted through individually tilting the DMDs, instead of physically rotating the DMD array, the disclosed receiver can eliminate the motor/actuator necessary to rotate the conventional rotational mirror. Therefore, the use of DMDs help simplify the design and/or manufacture of the beam reflecting unit.

Referring back to FIG. 4, DMD array 400 includes a plurality of DMDs 402 arranged in an 8×8 array, along the x-y plane. As previously explained, in the present disclosure, the receiving aperture of a beam reflector may be determined by the number of DMDs 402 that are in the "ON" state. For example, when all DMDs 402 in DMD array 400 are in the "ON" state, the receiving aperture may be equal to the size/dimensions (e.g., area covered by) of DMD array 400. In various embodiments, the number of DMDs in array 400 may vary, depending on the FOV and/or design of LiDAR system 102. For example, DMD array 400 may be an 8×8 array in a 64-line LiDAR system, a 16×8 array in a 128-line LiDAR system, or a 16×16 array in a 256-line LiDAR system. Because DMDs 402 can individually rotate at a sufficiently fast speed to accommodate the scanning speed of the LiDAR system, the number of DMDs 402 included in DMD array 400 can be increased to achieve a greater receiving aperture, and the response time of DMD array 400 is determined by the response time of the individual DMDs 402 reflecting the input laser beam, the size of DMD array 400 thus has little or no impact on the response time of DMD array 400.

The rotation and "ON/OFF" states of DMDs 402 may be controlled by one or more control signals. In some embodiments, one or more DMDs 402 may be coupled to and controlled by synchronized control signals such that these DMDs 402 can be switched to "ON" or "OFF" state at approximately the same time. The location and number of DMDs 402 that are switched to the "ON" state may be determined based on the design and application of LiDAR system 102, e.g., FOV of LiDAR system 102. In some embodiments, DMDs 402 in one row/column may be switched to the "ON" state simultaneously to reflect an input laser beam or switched to the "OFF" state simultaneously to deflect away any other signals (e.g., noise signals) other than the input laser beam. In some embodiments, each DMD 402 is coupled to and controlled by a respective control signal to rotate the DMD for a predetermined tilt angle to its operation angle in order to be switched to the "ON" state.

In some embodiments, DMD array 400 includes m DMDs (e.g., m=64, 128, 256, . . . ), arranged in an array of j rows (e.g., j=8, 16, . . . ) and k columns (e.g., k=8, 16, . . . ), where j and k are both positive integers, and m=j×k. The m DMDs may be operated at n operation angles, n being smaller or equal to m. In some embodiments, the DMDs in each of the j rows have a distinct operation angle, that is, n being equal to j. That is, the m DMDs may be arranged in n rows and k columns. In some embodiments, DMDs in each of the k columns have a distinct operation angle, that is, n being equal to k. That is, the m DMDs may be arranged in j rows and n columns. In some embodiments, each of the m DMDs has a distinct operation angle, that is, n being equal to m. In some embodiments, the operation angles of DMDs 402 may be made distinctly by manipulating the associated tilt angles and/or initial rotation angles of the individual DMDs. For example, DMDs 402 may be configured with distinct initial rotation angles such that they will be at distinct operation angles after being tilted for a same tilt angle. As another example, DMDs may be configured with a same initial rotation angle but be tilted for distinct tilt angles to arrive at the distinct operation angles.

FIGS. 6A and 6B illustrate an exemplary working mechanism of a beam reflector that includes array 400, according to some embodiments. For illustration purpose, FIGS. 6A and 6B show cross-sectional views of a column of DMDs 402 along an A-A' direction shown in FIG. 4. As shown in FIGS. 6A and 6B, each DMD 402 may be coupled to or mounted on a substrate through any suitable mechanical and/or electrical couplings (not shown), and may be coupled to and controlled by a respective control signal. In operation, each DMD 402 may be individually controlled to be rotated upon receiving the respective control signal. When DMD 402 receives an "ON" signal (e.g., a signal switching DMD 402 to the "ON" state), DMD 402 may be rotated to the respective operation angle to face the input laser beam. When DMD 402 receives an "OFF" signal (e.g., a signal switching DMD 402 to the "OFF" state), DMD 402 may be rotated to the respective non-operation angle and face away from the input laser beam.

FIG. 6A illustrates a first state when no control signal is applied on the respective DMD. As shown in FIG. 6A, each DMD 402 may be at an initial rotation angle. In various embodiments, the initial rotation angle is determined by the structure and/or mechanical coupling of DMD 402, and may or may not be adjustable during operation. In an example, the initial rotation angle may be determined during the fabrication of DMD 402 and is not adjustable. As shown in FIG. 6A, DMDs 402, from bottom to top along the y-axis, may respectively have initial rotation angles of $\theta_{11}$, $\theta_{12}$, $\theta_{13}$, $\theta_{14}$, $\theta_{15}$, $\theta_{16}$, $\theta_{17}$, and $\theta_{18}$. The initial rotation angles of $\theta_{11}$-$\theta_{18}$ may be the same or different, depending on the design of LiDAR system 102. In some embodiments, initial rotation angles of $\theta_{11}$-$\theta_{18}$ may each be different from one another. For example, the initial rotation angle may be any suitable value between 0° to 30°.

FIG. 6B illustrates a second state when a control signal is applied to cause the respective DMD to rotate to the "ON" state. As shown in FIG. 6B, control signals may be applied to the respective DMDs in the column so that the DMDs can each be further rotated by the respective tilt angle to reach the respective operation angle $\theta_{OP}$. The operation angles of the DMDs may thus be equal to the combination of the respective initial rotation angles and the respective tilt angles.

As an example, as shown in FIG. 6B, DMDs 402, from bottom to top along the y-axis, may respectively have operation angles of $\theta_{OP1}$, $\theta_{OP2}$, $\theta_{OP3}$, $\theta_{OP4}$, $\theta_{OP5}$, $\theta_{OP6}$, $\theta_{OP7}$, and $\theta_{OP8}$. The operation angles of $\theta_{OP1}$-$\theta_{OP8}$ may be the same or different, depending on the design of LiDAR system 102. In some embodiments, operation angles of $\theta_{OP1}$-$\theta_{OP8}$ may each be different from one another. By combining the initial rotation angle and the tilt angle of each DMD 402, the operation angles of DMDs 402 can be customized to cover a larger range of values and light deflection can be flexibly controlled. As a result, input laser beams from a wider range of directions, compared to conventional rotational mirror, can be effectively deflected and collected.

In operation, DMDs 402 in array 400 may or may not be in the "ON" state at the same time. In some embodiments, only a subset of DMDs 402 determined to receive and deflect the input laser beam are switched to the "ON" state at any given time during light deflection. For example, depending on the incident direction of the input laser beam, selected DMDs 402 may be switched to the "ON" state to deflect the input laser beam to a desired direction towards photosensor 216.

In some embodiments, during a LiDAR scan, transmitter 202 may sequentially emit laser beams to the object at different scanning angles. Accordingly, some or all DMDs 402 may be in the "ON" state sequentially to deflect input laser beams coming from different directions towards a relatively small photosensor. As an example, some DMDs 402, such as DMD 402-1 shown in FIGS. 4 and 6B, may be tilted to its operation angle $\theta_{OP5}$ and thus switched to the "ON" state. A first input laser beam 502 may be incident on the top surface of DMD 402-1 and deflected in a desired direction towards a location (such as photosensor 216) as an output laser beam 504. In some embodiments, some other DMDs 402, such as DMD 402-2, may be tilted to its operation angle $\theta_{OP6}$, and become in the "ON" state at the next time point with DMD 402-1 switched to the "OFF" state. $\theta_{OP6}$ may be different from $\theta_{OP5}$. A second input laser beam 506 traveling in a different direction may be incident on the top surface of DMD 402-2 and deflected in a desired direction towards the same location (such as photosensor 216) as an output laser beam 508. By sequentially switching on DMDs of different operation angles, the DMD array can deflect incident laser signals coming from different directions, thus covering the scanning FOV. As a result, the various laser beams coming from different directions may be deflected to the same location to be collected by a single photosensor.

In some embodiments, at any given time, only one selected DMD, such as DMD 402-1, may be switched on in DMD array 400, and other DMDs 402 are in the "OFF" state. In some other embodiments, multiple DMDs 402 may be switched to the "ON" state simultaneously to deflect input laser beams received by the multiple DMDs. The DMDs 402 that are simultaneously switched to the "ON" state in operation may have the same operation angle suitable for deflecting the input laser beam coming in a specific direction at the given time. In some embodiments, in order to achieve a relatively large receiving aperture, DMDs with the same operation angle may spread out in DMD array 400 as much as possible and as evenly as possible.

FIG. 3B illustrates another configuration of receiver 204, according to some embodiments. As shown in FIG. 3B, beam reflecting unit 220 may be placed between object 212 (referring to FIG. 2) and lens 214. First laser beam 302 may represent returned laser beam 211. First laser beam 302 may be incident on and deflected by beam reflecting unit 220, forming second laser beam 304. Second laser beam 304 may be incident on and converged by lens, forming third laser beam 306. Third laser beam 306 may be collected by photosensor 216, which outputs an electrical signal 218 that can be detected by other hardware and/or software, such as controller 222.

Similar to beam reflecting unit 220 illustrated in FIG. 3A, first laser beam 302 and second laser beam 304 may respectively be the input and output laser beams of beam reflecting unit 220. Second laser beam 304 may be deflected by beam reflecting unit 220 before being received by lens 214. A distance between beam reflecting unit 220 and lens 214 may be D2, which can be adjusted through a motor/actuator coupled to beam reflecting unit 220, similar to D1. Also, the orientation of beam reflecting unit 220 (e.g., each beam reflectors in beam reflecting unit 220) can be adjusted/optimized by rotating beam reflecting unit 220 using the motor/actuator. The details of the working mechanism described in connection with FIGS. 3A, 4, 5, 6A, and 6B may also apply to beam reflecting unit 220 in FIG. 3B, and therefore are not repeated herein.

FIG. 3C illustrates another configuration of receiver 204, according to some embodiments. Different from the configurations illustrated in FIGS. 3A and 3B, receiver 204 in FIG. 3C includes two beam reflecting units 220-1 and 220-2.

As shown in FIG. 3C, beam reflecting unit 220-1 may be placed between object 212 (like in FIG. 3B) and lens 214, and beam reflecting unit 220-2 may be placed between lens 214 and photosensor 216 (like in FIG. 3A). First laser beam 302 may represent returned laser beam 211. First laser beam 302 may be incident on and deflected by beam reflecting unit 220-1, forming a second laser beam 304. Second laser beam 304 may be incident on and converged by lens 214, forming a third laser beam 306. Third laser beam 306 may be incident on and deflected by beam reflecting unit 220-2, forming a fourth laser beam 308. Fourth laser beam 308 may be collected by photosensor 216, which outputs an electrical signal 218 that can be detected by other hardware and/or software, such as controller 222.

Similar to those illustrated in FIGS. 3A and 3B, first laser beam 302 and second laser beam 304 of FIG. 3C may respectively be the input and output laser beams of beam reflecting unit 220-1, and third laser beam 306 and fourth laser beam 308 may respectively be the input and output laser beams of beam reflecting unit 220-2. Second laser beam 304 may be deflected by a reflection angle of beam reflecting unit 220-1 before being received by lens 214, and fourth laser beam 308 may be deflected by a reflection angle of beam reflecting unit 220-2 before being received by photosensor 216. In various embodiments, the reflection angles of beam reflecting units 220-1 and 220-2 can be the same or different. The combination of the reflection angles of beam reflecting units 220-1 and 220-2 causes output laser beam 308 to travel towards and be received by photosensor 216.

A distance between beam reflecting unit 220-1 and lens 214 may be D3, and a distance between lens 214 and beam reflecting unit 220-2 may be D4. D3 and D4 can each be adjusted through a respective motor/actuator coupled to beam reflecting units 220-1 and 220-2, similar to D1 and D2. Also, the orientation of beam reflecting units 220-1 and 220-2 (e.g., the orientation of each beam reflector in the respective beam reflecting unit) can be adjusted/optimized by rotating beam reflecting units 220-1 and/or 220-2 using the motors/actuators. The details of the working mechanism described in connection with FIGS. 3A, 3B, 4, 5, 6A, and 6B can also apply to beam reflecting units 220-1 and 220-2 in FIG. 3C, and therefore are not repeated herein.

Referring back to FIG. 2, photosensor 216 may include any photo-sensitive material that can convert light (i.e., photons) into an electric current (e.g., electrical signal 218). Photosensor 216 can also be referred to as a beam sensor. In some embodiments, photosensor 216 includes a single photodetector. In some embodiments, photosensor 216 includes a photodetector array. The electric current is generated when photons are absorbed in the photodiode. By using beam reflecting units, returned laser beam 211 can be quickly and effectively detected by photosensor 216. High-speed scanning can be achieved.

Controller 222 may be configured to control transmitter 202 and/or receiver 204 to perform detection/sensing operations. In some embodiments, controller 222 may apply an electrical signal to each DMD in beam reflecting unit 220 to individually control the "ON" and "OFF states of the DMDs, in order to deflect the input laser beam. In some embodiments, to switch "ON" a DMD, the control signal applied may cause the DMD to rotate by a tilt angle to its operation angle. For example, controller 222 may be configured to determine the proper control signal, to tilt the DMD by the desired tilt angle. In some embodiments, the intensity of the control signal may be proportional to the desired tilt angle.

Controller 222 may include components (not shown) such as a communication interface, a processor, a memory, and a storage for performing various control functions. In some embodiments, controller 222 may have different modules in a single device, such as an integrated circuit (IC) chip (implemented as, for example, an application-specific integrated circuit (ASIC) or a field-programmable gate array (FPGA)), or separate devices with dedicated functions. In some embodiments, the processor may include any appropriate type of general-purpose or special-purpose microprocessor, digital signal processor, or microcontroller. The memory or storage may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. For example, the memory and/or the storage may be configured to store program(s) that may be executed by the processor to control the operation of beam reflecting unit 220 to deflect the laser beams in desired directions.

Figure 7:
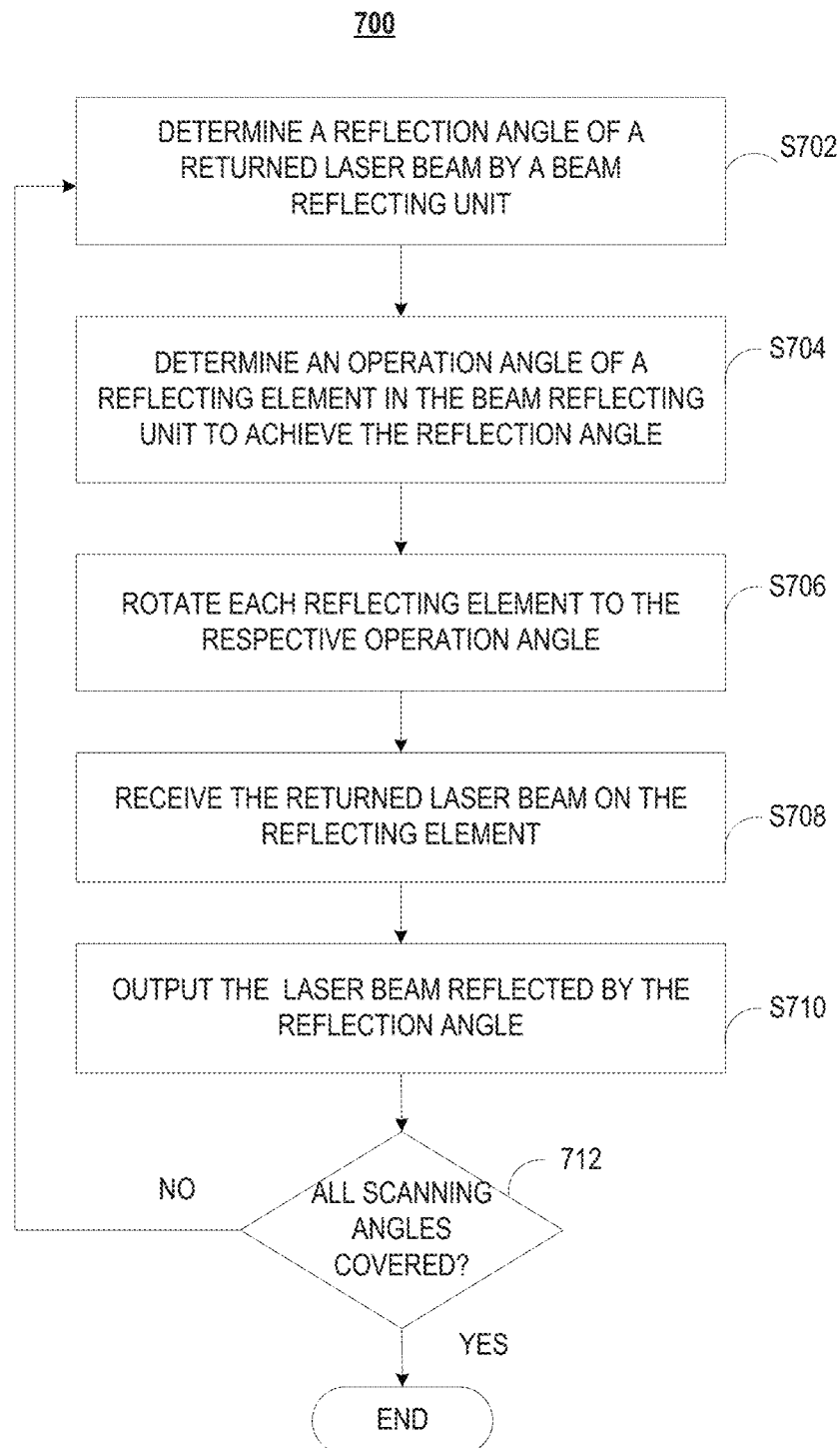
FIG. 7 illustrates a flowchart of an exemplary method to reflect a laser beam using a beam reflecting unit, according to embodiments of the disclosure.

FIG. 7 illustrates a method 700 using the disclosed beam reflecting unit to deflect laser beams in a receiver of a LiDAR system, according to embodiments of the present disclosure. In some embodiments, method 700 is performed by beam reflecting unit 220, controller 222 along with components of receiver 204. In some embodiments, the beam reflecting unit may include one or more beam reflector each including a plurality of reflecting elements for receiving and deflecting laser beams.

At step S702, the beginning of method 700, a reflection angle of a returned laser beam by a beam reflecting unit is determined. The returned laser beam may be a laser beam emitted by a transmitter of the LiDAR system to an object and then returned from the object. In some embodiments, travel direction of the returned laser beam is determined based on the scanning angle of the laser beam, e.g., before impinging on the object. The scanning angle can be within a range of angles depending on the transmitter FOV. Based on the travel direction of the returned laser beam and the configuration of the receiver, e.g., locations and dimensions of components within the receiver, a desired reflection angle of by the beam reflecting unit, can be determined. In some embodiments, the returned laser beams, when reflected by respective desired reflection angles, all travel towards photosensor 216 of receiver 204. In some embodiments, the reflection angle may be a combination of reflection angles of individual beam reflectors in the beam reflecting unit and respective reflection angle of each beam reflector is determined.

At step S704, an operation angle of a reflecting element in the beam reflecting unit is determined to achieve the reflection angle. Based on the reflection angle of the beam reflecting unit, the reflecting elements to switch "ON" for deflecting the returned laser beam may be selected in each beam reflector, and the operation angle of such reflecting elements may be determined. In some embodiments, when the selected reflecting elements are oriented at the operation angle, the input laser beam may impinge on the reflecting elements at the reflection angle. In some embodiments, the reflecting elements are selected such that a maximum portion of the returned laser beam (e.g., all of the returned laser beam) is received on the reflecting element of each beam reflector. In some embodiments, because the initial rotation angle may be a predetermined feature of each reflecting element and the operation angle is equal to a combination of an initial rotation angle and the tilt angle of the reflecting element, the tilt angle needed to tilt the reflecting element to the operation angle can be determined. For example, if the initial rotation angle is zero, the operation angle is equal to soley the tilt angle of the reflecting element.

At step S706, each selected reflecting element to receive and deflect the returned laser beam may be switched to the "ON" state by being rotated to the respective operation angle. In some embodiments, e.g., similar to the working mechanism illustrated in FIGS. 6A and 6B, more than one (e.g., all) reflecting elements in a respective beam reflector are switched to the "ON" state at the same time. In some embodiments, unselected reflecting elements may be rotated to the non-operation angle to be switched to the "OFF" state. In some embodiments, each selected reflecting element is switched "ON" or "OFF" by a control signal, which controls the reflecting element to rotate by the tilt angle. In some embodiments, the control signal may be determined according to the tilt angle required for the respective reflecting element.

At step S708, the returned laser beam is received by the beam reflecting unit so that the returned laser beam impinges on the reflecting elements, selected in step S704 and switched to the "ON" state in step S706. For ease of illustration, the returned laser beam herein can be the returned laser beam before or after being converged by the lens in the receiver, e.g., similar to the input laser beam described in FIGS. 3A-3C. At step S710, the returned laser beam is deflected by the deflection angle of the beam deflecting unit towards a predetermined area. The deflected laser beam may then be outputted by the beam reflecting unit and received by a photosensor positioned at the predetermined area.

In some embodiments, after step S710, method 700 proceeds to step S712, which decides whether all scanning angles of the LiDAR system have been covered. If yes, method 700 ends. If no, method 700 returns to step S702, to adjust the beam deflecting unit such that it can receive and deflect another returned laser beam emitted at the next scanning angle. Method 700 may repeat steps S704-S710 to deflect the returned laser beam towards the same predetermined area using one or more different DMDs in the beam reflecting unit. Steps S702-S710 may be repeated for laser beam emitted at each scanning angle until all scanning angles of the LiDAR system have been covered.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A receiver for light detection and ranging (LiDAR) configured to receive an input laser beam from an object being scanned by a transmitter for LiDAR, the receiver comprising:
   a photodetector; and
   a beam reflecting unit comprising a plurality of digital micromirror devices (DMDs), the beam reflecting unit configured to converge the input laser beam to a sensing area of the photodetector and further configured to:
   receive the input laser beam returned from an object being scanned by the transmitter for LiDAR;

reflect the input laser beam by at least one DMD selectively switched to an "ON" state at an operation angle to form an output laser beam towards the photodetector;

wherein the photodetector issonfigured to receive the output laser beam.

2. The receiver of claim 1, wherein the plurality of DMDs comprise m DMDs operated at n operation angles to reflect the input laser beam by respective reflection angles and form the output laser beam, m and n being positive integers, m being greater than or equal to n, wherein the DMDs are switched to the "ON" state when operating at the respective operation angles.

3. The receiver of claim 2, wherein
the m DMDs are arranged in an array of n rows and k columns; and
DMDs in each of the n rows have a distinct operation angle.

4. The receiver of claim 2, wherein
the m DMDs are arranged in an array of j rows and n columns; and
DMDs in each of the n columns have a distinct operation angle.

5. The receiver of claim 2, wherein
the m DMDs are arranged in an array of j rows and k columns; and
each of the m DMDs has a distinct operation angle, n being equal to m.

6. The receiver of claim 1, wherein the at least one DMD is adjusted to the operation angle after being rotated by a tilt angle from an initial rotation angle.

7. The receiver of claim 6, wherein the plurality of DMDs comprise a first DMD associated with a first tilt angle and a second DMD associated with a second tilt angle, wherein the first tilt angle is different from the second tilt angle.

8. The receiver of claim 6, wherein the plurality of DMDs comprise a first DMD associated with a first initial rotation angle and a second DMD associated with a second initial rotation angle, wherein the first initial rotation angle is different from the second initial rotation angle.

9. The receiver of claim 1, wherein the remaining DMDs other than the at least one DMD are switched to an "OFF" state at respective non-operation angles.

10. The receiver of claim 1, further comprising a controller configured to:
select the at least one DMD to switch on based on a reflection angle calculated to reflect the input laser beam towards the photodetector; and
generate a control signal to adjust the at least one DMD to the operation angle.

11. A receiver for light detection and ranging (LiDAR) configured to receive a first input laser beam and a second input laser beam from an object being scanned by a transmitter for LiDAR, the receiver comprising:
a beam reflecting unit comprising a plurality of digital micromirror devices (DMDs) including a first DMD and a second DMD, the beam reflecting unit configured to converge the first input laser beam received in a first direction and the second input laser beam received in a second direction to a sensing area of the photodetector and further configured to:
reflect the first input laser beam from an object being scanned by the transmitter for LiDAR in the first direction by the first DMD at a first operation angle to form a first output laser beam; and
reflect the second input laser beam from the object by the object being scanned by the transmitter for LiDAR in the second direction by the second DMD at a second operation angle to form a second output laser beam, the first operation angle being different from the second operation angle;
a photodetector configured to receive the first output laser beam reflected by the first DMD and second output laser beam reflected by the second DMD.

12. The receiver of claim 11, further comprising a controller configured to:
select the first DMDs among the plurality of DMDs based on the first direction of the first input laser beam;
generate a first control signal to adjust the first DMD to the first operational angle.

13. The receiver of claim 11, wherein the first DMD is adjusted to the first operation angle by being rotated from a first initial rotation angle and the second DMD is adjusted to the second operation angle by being rotated from a second initial rotation angle, the first initial rotation angle being different from the second initial rotation angle.

14. The receiver of claim 11, wherein first DMD is adjusted to the first operation angle by 5 being rotated by a first tilt angle and the second DMD is adjusted to the second operation angle by being rotated by a second tilt angle, the first tilt angle being different from the second tilt angle.

15. A method for receiving a laser beam in a light detection and ranging (LiDAR) performed by a receiver for LiDAR configured to receive a first laser beam from an object being scanned by a transmitter for LiDAR, the method comprising:
receiving the first laser beam from an object being scanned by the transmitter for LiDAR on a beam reflecting unit, the beam reflecting unit having a plurality of digital micromirror devices (DMDs) and being configured to converge the first laser beam to a sensing area of a photodetector;
switching a first DMD of the plurality of DMDs to an "ON" state by rotating the first DMD to a first operation angle;
reflecting the first laser beam by the first DMD towards the photodetector; and
receiving the reflected first laser beam from the first DMD on the photodetector.

16. The method of claim 15, further comprising:
receiving a second laser beam from the object on the beam reflecting unit;
switching a second DMD of the plurality of DMDs to the "ON" state by rotating the second DMD to a second operation angle, the second operation angle being different from the first operation angle;
reflecting the second laser beam by the second DMD towards the photodetector; and
receiving the reflected second laser beam on the photodetector.

17. The method of claim 16, wherein the first DMD is rotated to the first operation angle from a first initial rotation angle and the second DMD is rotated to the second operation angle from a second initial rotation angle, the first initial rotation angle being different from the second initial rotation angle.

18. The method of claim 16, wherein the first DMD is rotated by a first tilt angle to the first operation angle and the second DMD is rotated by a second tilt angle to the second operation angle, the first tilt angle being different from the second tilt angle.

19. The method of claim 15, further comprising:
determining a travel direction of the first laser beam; and selecting the first DMD from the plurality of DMDs based on the travel direction such that the first DMD, at the first operation angle, reflects the first laser beam towards the photodetector.

20. The method of claim 15, further comprising further comprising switching the remaining DMDs of the plurality of DMDs other than the first DMD to an "OFF" state by rotating them to respective non-operation angles.

* * * * *